United States Patent
Panico et al.

(10) Patent No.: US 8,150,402 B2
(45) Date of Patent: Apr. 3, 2012

(54) METHOD FOR PLANNING A CELLULAR MOBILE TELECOMMUNICATIONS NETWORK

(75) Inventors: Massimiliano Panico, Turin (IT); Indro Francalanci, Turin (IT)

(73) Assignee: Telecom Italia S.p.A., Milan (IT)

( * ) Notice: Subject to any disclaimer, the term of this patent is extended or adjusted under 35 U.S.C. 154(b) by 858 days.

(21) Appl. No.: 11/992,591

(22) PCT Filed: Sep. 30, 2005

(86) PCT No.: PCT/EP2005/010591
§ 371 (c)(1),
(2), (4) Date: Mar. 26, 2008

(87) PCT Pub. No.: WO2007/038955
PCT Pub. Date: Apr. 12, 2007

(65) Prior Publication Data
US 2009/0176500 A1     Jul. 9, 2009

(51) Int. Cl.
*H04B 7/185* (2006.01)
*H04J 3/12* (2006.01)
(52) U.S. Cl. .................. 455/446; 455/450; 370/329
(58) Field of Classification Search ............ 455/446
See application file for complete search history.

(56) References Cited

U.S. PATENT DOCUMENTS

| 5,710,758 A | 1/1998 | Soliman et al. | |
|---|---|---|---|
| 5,859,839 A * | 1/1999 | Ahlenius et al. | 370/252 |
| 6,173,186 B1 * | 1/2001 | Dalley | 455/446 |

(Continued)

FOREIGN PATENT DOCUMENTS
EP    1 508 986 B1    12/2005
(Continued)

OTHER PUBLICATIONS

"3$^{rd}$ Generation Partnership Project; Technical Specification Group Radio Access Networks; RF System Scenarios (Release 1999)", 3GPP TR 25.942 V3.0.0 pp. 1-110, (2001).

(Continued)

*Primary Examiner* — Rafael Pérez-Gutiérrez
*Assistant Examiner* — Frank Donado
(74) *Attorney, Agent, or Firm* — Finnegan, Henderson, Farabow, Garrett & Dunner, L.L.P.

(57) ABSTRACT

A method for planning a cellular mobile telecommunications network includes at least one network cell and is intended to provide network services to users located in the network cell. The method includes: a) initializing, for the at least one network cell, a service area and a transmission power for each user equipment; b) estimating a total power received by the at least one network cell from user equipment located in the service area and using the at least one network service; c) based on the estimated total received power, varying the transmission powers required to user equipment located in the service area in order to reach a target quality of service constraint for the at least one network service; d) iterating the steps b) and c) until a stability condition is reached wherein the transmission power variation for at least a predetermined fraction of the user equipment is lower than a predetermined threshold; e) calculating a total received power corresponding to the transmission powers at the end of step d); f) calculating an uplink load factor corresponding to the total received power calculated in step e); g) ascertaining whether the calculated uplink load factor is lower than a maximum uplink load factor, and, in the negative case: h) restricting said service area; and i) repeating the steps from b) to g).

16 Claims, 5 Drawing Sheets

U.S. PATENT DOCUMENTS

| | | | |
|---|---|---|---|
| 7,668,708 B2 * | 2/2010 | Vicharelli et al. | 703/13 |
| 2003/0087641 A1 * | 5/2003 | Gustafsson | 455/446 |
| 2004/0014476 A1 * | 1/2004 | Barberis et al. | 455/446 |
| 2004/0048630 A1 * | 3/2004 | Shapira | 455/509 |
| 2007/0066317 A1 * | 3/2007 | Amft et al. | 455/446 |
| 2007/0099608 A1 * | 5/2007 | Vicharelli et al. | 455/423 |
| 2007/0127407 A1 * | 6/2007 | Attar et al. | 370/318 |

FOREIGN PATENT DOCUMENTS

| | | |
|---|---|---|
| GB | 2 392 054 A | 2/2004 |

OTHER PUBLICATIONS

R. Menolascino et al.; Project Title: "STORMS: Software Tools for the Optimisation of Resources in Mobiles Systems", Project No. AC016, A016/CSE/MRM/DR/P/091/a1, pp. i-vii and 1-57, (1999).

A. Wacker et al.; "Static simulator for Studying WCDMA Radio Network Planning Issues", Vehicular Technology Conference, IEEE 49$^{th}$ Houston, TX, vol. 3, pp. 2436-2440, (1999).

* cited by examiner

METHOD FOR PLANNING A CELLULAR MOBILE TELECOMMUNICATIONS NETWORK

CROSS REFERENCE TO RELATED APPLICATION

This application is a national phase application based on PCT/EP2005/010591, filed Sep. 30, 2005, the content of which is incorporated herein by reference.

FIELD OF THE INVENTION

The present invention generally relates to the field of telecommunications, particularly to mobile telecommunications networks, allowing communications between mobile users. More specifically, the invention relates to cellular mobile telecommunications networks, particularly to radio telecommunications networks, and even more particularly to those networks that adopt a Code Division Multiple Access (CDMA) or Wideband CDMA (WCDMA) access scheme, such as cellular networks of the third generation, like those complying with the Universal Mobile Telecommunications System (UMTS).

BACKGROUND OF THE INVENTION

Mobile telecommunications networks are usually arranged according to a cellular structure comprising a plurality of cells, each cell being defined as the set of elementary territory areas (also referred to as "pixels") served by the radio-electric signal radiated from a respective Base Radio Station (BRS), or antenna.

Among the known cellular networks, networks using the CDMA or WCDMA technique have the peculiarity that a same frequency band (or "channel") can be re-used in the various cells. Therefore, the passage of a mobile communications terminal from one cell to another, contiguous cell (an event called "handover") can be managed by using the same frequency, according to a mechanism called "soft-handover"; this mechanism provides that, in particular geographic areas, called "soft-handover areas" or "macro-diversity areas", the mobile communications terminal is able to decode signals from, and therefore to exchange information with many antennas and consequently with many BRSs.

The location of the macro-diversity areas and their dimensioning are highly important factors for the correct operation and dimensioning of the network cells' apparatuses: a mobile communications terminal operating in macro-diversity uses resources of all the BRSs with which it is simultaneously connected, thus the terminal in macro-diversity uses more resources than those actually necessary for allowing the communications.

A further peculiarity of UMTS networks is that such networks are adapted to provide a plurality of different network services, such as, for example, telephony, fax, video-telephony, Internet access and Web browsing, streaming and so on. Each one of such services generally has characteristics in terms of speed (number of bits per second) and traffic (amount, symmetrical or asymmetrical) that are specific for the service under examination.

The dimensioning of the cells should therefore take into account both the characteristics of each service, and the possible associations of services over a single radio carrier, as provided for by the CDMA/WCDMA access technique.

Moreover, like every cellular radio-mobile system, also a UMTS network has common broadcast control channels in the whole cell area. Such channels contain system information, that are necessary for radio apparatuses (receivers) of the mobile communications terminals.

Due to the networks' peculiarities, the planning of UMTS networks is a complex task, requiring approaches that are substantially different from those used for previous cellular mobile telecommunications networks, particularly second-generation cellular networks like those complying with the Global System for Mobile Communication (GSM) standard, or with the Interim Standard (IS95).

In general, in view of a current network deployment, the planning aims to produce, as results or outputs, the proper positioning of the BRSs in the geographic area under examination, and also allows determining the set of radio-electric cell parameters (e.g., antenna tilt, azimuth of the direction of maximum gain, radio power, etc.) and the allocation of the radio resources assigned to the network operator (for example, radio carriers). Such outputs are determined by the planning process in compliance with planning objectives, such as, for example:

minimum value of territory covered by the network service, within an area under planning;

maximization of the traffic to be managed among those provided within the area under planning.

Various planning techniques for UMTS networks are known; according to the followed approach, these techniques can be grouped into two different classes: statistical planning techniques and deterministic planning techniques.

Statistical planning techniques are mainly based on an approach of the Montecarlo type (refer for example to the document 3GPP TR 25.942 v3.0.0 2001-06—"RF System Scenarios—Release 1999" specification). The term "Montecarlo simulation" usually denotes a static simulation composed of a set of statistically independent snapshots. After having fixed the scenario being studied, each snapshot consists in realizing a stochastic process generated starting from different distributions of users in the area being examined. At the end of every snapshot, network performance indicators are provided as results, and the procedure ends with the statistical analysis of various performance indicators provided by every snapshot. The number of snapshots shall be enough to guarantee statistical stability for the planning results. This methodology is rather specific, and it is particularly adapted for examining performances of a UMTS network of relatively limited geographic width; owing to its intrinsic slowness, due to the statistical convergence of results, this technique is not suitable for the analysis of UMTS networks intended to cover geographical areas comparable with those of an entire nation, such as, for example, Italy.

Though keeping the characteristic of a static analysis, the deterministic planning techniques systematically take into account all pixels of the territory on which the network will be planned. Differently from statistical methods, the deterministic methods exploit, as input data, a single users distribution, and a single simulation is carried out, without the need of a statistical aggregations of the results. Deterministic planning techniques are more suitable for planning UMTS networks intended to cover relatively large geographical areas, even if the planning result is generally less adherent to the evolving reality.

Irrespective of the approach followed, one of the phases of the methods for planning a cellular mobile telecommunications network of the type herein considered, is the uplink coverage planning/evaluation, also referred to as "power control on the uplink", i.e. the planning/evaluation of the coverage in the link from UEs located on the pixels of the area under planning to the BRSs. In this phase, the transmission power required per traffic channel to the UEs located on the pixels of the area under planning is calculated. For each pixel belonging to the area under planning, and for each network service, the cell is determined which requires the lowest transmission power to an hypothetic UE located on that pixel and using that network service: the cell thus determined represents the serving cell of that pixel, as far as that network service is considered. If the lowest transmission power required to the UEs calculated in this phase exceeds the maximum power deliverable by the generic UE (a parameter which is predetermined and forms one of the inputs to the planning process), the pixel under consideration is put in outage for insufficient power in uplink: in other words, given the current network configuration, a generic UE located on that pixel will not be in condition of using that network service, because the transmission power that would be necessary for doing this is too high. The set of pixels for which the generic cell is the serving cell in respect of the generic network service forms the "cell uplink service area" of that cell for that service in uplink. The set of cell uplink service areas for the various cells of the area under planning and for the various network services forms the "network uplink service area". The set of pixels put in outage for insufficient power in uplink, for the generic network service, forms the "service outage area" in uplink.

Essentially, in the uplink power control phase, a plurality of sets of maps is determined, one set of maps for each network service; the generic set of maps includes in turn a number of maps equal to the number of cells of the area under planning: each map is formed by those pixels for which the respective cell (the serving cell) requires the lowest power in the uplink, those pixels for which the transmission power in uplink exceeds the predetermined maximum transmission power of the generic UE, for the generic network service being eliminated.

In a following phase of the planning process, referred to as "power control on the downlink", the planning/evaluation of the coverage in the link from the BRSs to the UEs located on the pixels of the area under planning is carried out, so to ascertain whether the downlink is a limiting factor. For each cell of the area under planning, the transmission power per traffic channel that the generic cell should deliver is calculated, for each pixel belonging to the cell uplink service area of that cell and for each network service (i.e., for example, for the telephony, facsimile, video-telephony, Internet access, e.g., Web browsing, services). If the calculated power, for the generic pixel, exceeds the maximum power that the serving cell can deliver for a traffic channel in respect of the considered network service, that pixel is put "out-of-service" ("outage") for insufficient power in the downlink. In other words, even if the generic UE located on that pixel would be able to deliver the necessary transmission power for communicating with the BRS, it is the BRS that is not in condition to sustain the necessary transmission power for providing that service. The set of pixels, belonging to the service area of the generic cell in respect of the generic network service, not being in outage, forms the overall service area of the cell in respect of that network service. The union of all the overall service areas for all the network services and for all the cells of the area under planning is referred to as the global service area of the network (in the area under planning).

The downlink power control phase also encompasses a cell "capacity check" on the downlink: the overall power that, according to the above-mentioned calculations, is estimated to be required to the generic cell is compared to the maximum power that the (power amplifiers of the BRS of the) cell can deliver: if the calculated overall required power exceeds the maximum power that the cell can deliver, the cell does not pass the capacity check, and it might be necessary to modify the traffic distribution and/or the locations of the cells in the area under planning.

A UMTS network planning methodology is described in the document AC016/CSE/MRM/DR/P/091 entitled "STORMS Project Final Report", developed under the STORMS (Software Tools for the Optimization of Resources in Mobile Systems) project, promoted by the European Union. The planning methodology described in that document provides for an analysis of the uplink capacity of the cells (BRSs) based on interference/noise limitations. The maximum cell capacity in uplink, in terms of maximum number of active calls per cell and per service type (CA, CB, ..., CN) is determined by solving the following linear system:

$$\eta = (1 + f_{extra}) \sum_{i=A}^{N} C_i SAF_i^{UL} SINR_i$$

$$\frac{C_i}{C_{REf}} = k_i \quad i = A, B, \ldots, N$$

where $\eta$ is a multi-service fractional load factor (with respect to the full load condition), assumed as the nominal load of the cell, $f_{extra}$ is a normalized inter-cell interference factor (which is characteristic of the environment), $SAF_i^{UL}$ is a service activity factor in uplink for the generic network service, and $SINR_i$ is a target signal to interference plus noise ratio.

Factors $k_i$ describe the requested traffic mix in terms of ratio between the maximum active calls per each service and a reference one. These parameters have to be consistent with the correspondent traffic mix figures, which describe the offered traffic mix (in Erl) for the pixel under study. To derive these parameters, an iterative procedure is adopted. In fact, factors $k_i$ refer to the partitioning of the active calls among different services on the cell area, i.e., they correspond to the maximum number of circuits required to carry the offered traffic load on the cell area.

Thus, to evaluate them, the traffic load of the cell should be known. To derive it from the traffic load per pixel, which is the available input data, the cell dimension should be known. But this is in fact the final goal of the evaluation process. To solve this plight, an iterative process is proposed. A first, rough estimate of the cell area (i.e., number of pixels) is produced, and the correspondent traffic load per service is evaluated by multiplying the traffic value per service per pixel by the estimated number of pixels of the cell. Then, the traffic load is converted into the equivalent maximum number of active calls by means of the Erlang-B formula:

Max_Number_of_Users=Erlang_B(Traffic_load; Loss_Probability).

The loss probability assumed is 0.01. Based on this estimate for the cell traffic load, factors $k_i$ are evaluated and substituted in the previous equation of $\eta$. A new value for the cell capacity is obtained by solving the equation. The process is re-iterated (using the equation solution as a new starting point for the estimate of $k_i$) till it reaches the convergence. Finally, the correspondent maximum cell capacity (in Erl) is obtained by applying the Erlang-B formula to the final result of the previous step (by imposing a given loss probability).

SUMMARY OF THE INVENTION

The Applicant has observed that the methods known in the art for planning a UMTS network, particularly concerning the uplink power control phase, suffer from limitations that impact the efficiency of the whole planning method, and the networks built following such methods are as a consequence not optimized.

In particular, referring to the method described in the above cited document, the re-iteration leads to the reaching of a maximum load factor selected in advance as a design target; this methodology corresponds to performing a preliminary phase, hereinafter referred to as "admission control" phase, within a simplified calculation of the service areas, that aims at defining areas (i.e., set of pixels) for the calculations to be carried out in the following uplink power control phase.

The Applicant has observed that a strong limitation of the known planning methods, like that described in the cited document, is the dependence of the results, produced by the uplink power control phase, on the assumptions made in the preliminary, admission control phase. In particular, the Applicant has observed that the calculation areas are determined on the basis of simplifying assumptions for the interference experienced and caused by the cells of the area under planning, particularly by setting a maximum admissible interference value for the generic cell, and calculating the area in which the service can be guaranteed while respecting the requirement on the maximum admissible interference value. The maximum admissible interference value for a generic cell is set by setting an upper limit to the cell load in uplink (the load factor $\eta$). The assumption concerning the interference within a cell is made by setting a priori a value (in general varying from cell to cell), of an inter-cell interference factor, defined as the ratio of the overall power received by a generic cell from links not directly controlled in power by the cell (inter-cell interference) to the overall power received by the cell from users that are directly controlled in power by the cell, and thus belonging to the cell uplink service area for the service considered (intra-cell interference).

The value of the interference factor is closely related to the transmission power of the users in uplink; this information is not known a priori, being determined by the following uplink power control phase. Thus, in order to perform the admission control phase before the uplink power control phase, it is necessary to make an assumption for the value of the interference factor that cannot take into sufficiently accurate account the real interference in the area under planning. As a consequence, the calculation areas thus determined, on which the following uplink power control phase is based, may be not sufficiently close to the real interferential conditions, which are not known until after the uplink power control phase, and the global service areas that are calculated may be unrealistic and cause network malfunctioning.

Nevertheless, the admission control phase needs to be performed before the uplink power control phase, so as to avoid that, in the uplink power control phase, the service area calculated for the generic network service is too broad, with the risk of overloading the cell from the interference viewpoint. Indeed, one of the goals of the UMTS network planning is to limit the cell load in uplink, because too high average cell loads may in the practice cause instability conditions that worsen the quality of service experienced by the users.

In view of the outlined state of the art and related problems, drawbacks and limitations, the Applicant has tackled the general problem of improving the known planning methods of cellular mobile telecommunications networks.

In particular, the Applicant has tackled the problem of how to properly carry on the phases for the uplink analysis in the planning process of a CDMA network.

The Applicant has found that the above problems can be solved by performing an iterative procedure that, starting from an initial service area and an initial equipments' transmission power, comprises estimating the total power received by the cell and, based on this total received power, varying the equipments' transmission powers to reach a target quality of service constraint, until a stability condition is reached wherein the equipments' transmission power variation is lower than a threshold; if in this condition the total power received by the cell is higher than a maximum received power, the service area is restricted and the above cycle repeated by taking the restricted area.

According to a first aspect thereof, the present invention thus relates to a method for planning a cellular mobile telecommunications network including at least one network cell and intended to provide network services to user equipments located in said network cell, the method comprising:

a) initializing, for the at least one network cell, a service area and a transmission power for each user equipment;

b) estimating a total power received by the at least one network cell from the user equipments located in the service area and using the at least one network service;

c) based on the estimated total received power, varying the transmission powers required to the user equipments located in the service area in order to reach a target quality of service constraint for the at least one network service;

d) iterating the steps b) and c) until a stability condition is reached wherein the transmission power variation for at least a predetermined fraction of the user equipments located in the service area is lower than a predetermined threshold;

e) calculating a total received power corresponding to the transmission powers at the end of step d);

f) ascertaining whether the total received power is lower than a maximum received power, and, in the negative case:

g) restricting the service area; and h) repeating the steps from b) to g) for the restricted service area.

Preferably, the service area is restricted based on a difference between the calculated uplink load factor and the maximum uplink load factor. More preferably, the service area is restricted proportionally to the above difference.

Preferably, the service area comprises a plurality of elementary area elements, and the step of restricting comprises:

establishing an ordered list of the elementary area elements based on the value of a parameter indicative of a respective contribution of the elementary area elements to the total received power; and discarding at least one of the elementary area elements at one end of the list.

The above parameter may comprise the uplink link loss. In addition or in alternative, the above parameter may comprise the total traffic offered by the pixel. In addition or in alternative, the above parameter may comprise the type of traffic offered by the pixel.

The step of initializing the service area may include taking as an initial service area a best server area of the cell calculated for a predetermined communications channel.

The predetermined communications channel may be the Common Pilot CHannel CPICH.

The step of initializing, for the at least one network cell, the transmission power for each user equipment may include initializing the transmission power to a value dependent on, particularly proportional to, a value to which the service area is initialized.

In particular, the step of initializing, for the at least one network cell, the transmission power for each user equipment may include initializing the transmission power to a value dependent on, particularly proportional to, an amount of traffic offered to the cell based on a value to which the service area is initialized.

Preferably, the quality of service constraint is a target service signal-to-noise ratio.

Furthermore, the step of ascertaining whether the total received power is lower than a maximum received power may comprise calculating an uplink load factor corresponding to the total received power calculated in step e); and ascertaining whether the calculated uplink load factor is lower than a maximum uplink load factor.

The present invention further relates to a data processing system comprising means adapted to carry out the steps of the method described above.

In a further aspect thereof, the present invention relates to a computer program comprising instructions for carrying out all the steps of the method described above, when said computer program is executed on a computer system.

The present invention also relates to a cellular mobile telecommunications network including at least one network cell and intended to provide network services to users located in said network cell, wherein the network services include at least one network service, the network having a service area in respect of the at least one service obtained by applying the method described above.

BRIEF DESCRIPTION OF THE DRAWINGS

The features and advantages of the present invention will be made apparent by the following detailed description of an embodiment thereof, provided merely by way of non-limitative example, description that will be conducted making reference to the annexed drawings, wherein.

DETAILED DESCRIPTION OF THE PREFERRED EMBODIMENT(S) OF THE INVENTION

Figure 1:
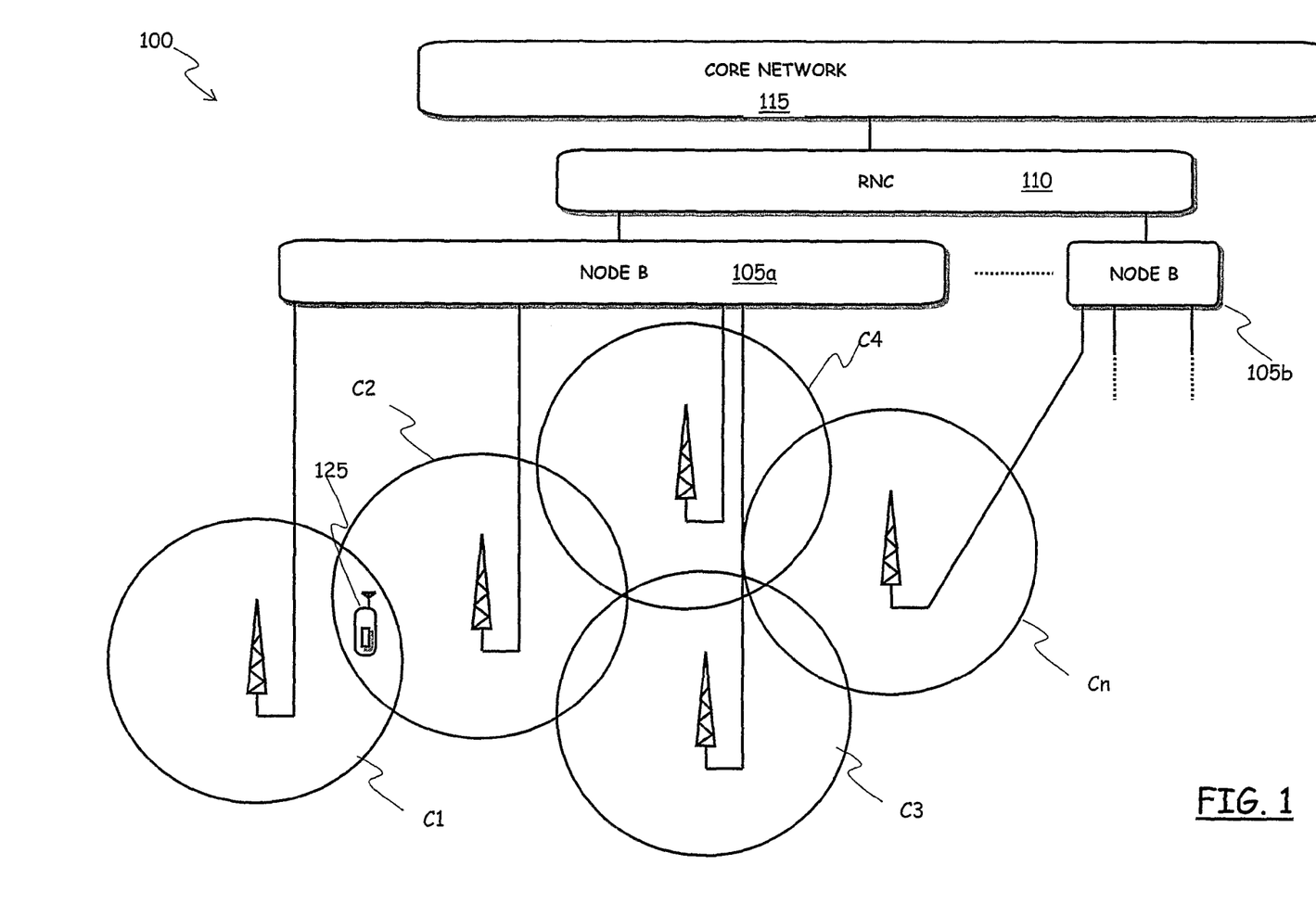
FIG. 1 pictorially shows a portion of a UMTS network being planned, intended to cover a respective geographic area, with a plurality of network cells.

Referring to the drawings, in FIG. 1 there is schematically depicted a portion of a CDMA network, particularly a UMTS network under planning, the network portion being intended to provide cellular mobile communications capability within a given geographic area.

The UMTS network portion under consideration, identified globally by reference numeral 100, comprises a plurality of cells C1, C2, C3, C4, ..., Cn (schematically depicted as circles), each one having a respective area coverage (the area of the circles). The cells C1, C2, C3, C4, ..., Cn are each one made up of a plurality of pixels, i.e., they are the set of geographic points covered and served by the radio electromagnetic signal irradiated by a respective cell's BRS, schematized in the drawing as an antenna.

Usually, groups of three to six cells (on average) are managed by a network entity called "Node B", such as the Node Bs 105a and 105b in the drawing (where, merely by way of example, it is assumed that the cells C1, C2, C3, and C4, are managed by the Node B 105a, and that the cell Cn is managed by the Node B 105b).

Groups of Node Bs are managed by a Radio Network Controller (RNC), like the RNC 110 shown in the drawing; the RNCs are connected to the core UMTS network 115.

A generic UE, like the UE 125 depicted as located within the cell C1, can receive signals transmitted by the transmitters, and irradiated by the antennas, of different cells, e.g. the cells C1 and C2, and is able to differentiate among them.

This differentiation of signals coming from different transmitters is made possible by the adoption, in the UMTS standard, of the CDMA/WCDMA access technique. Without entering into excessive details, known to those skilled in the art and not relevant to the understanding of the present invention embodiment, each transmitter (particularly, the transmitter of the generic network cell) implements a spreading and a subsequent scrambling of the signal to be transmitted. The signal (data) to be transmitted, having a given symbol rate (usually called the bit rate) is first submitted to a spreading process, using a spreading code, in order to "widen" its spectrum and distribute (and thus lower) its power over the whole channel bandwidth. The spreading code has a higher number of symbols than the signal to be transmitted, thus the spread signal has a symbol rate (a "chip rate", in jargon) higher than the bit rate of the initial signal. The spread signal is then submitted to a scrambling process, using a scrambling code or scrambling sequence. The signal scrambling process does not change the chip rate, thus the signal to be transmitted "over-the-air" has a chip rate equal to that of the spread signal. The scrambling process is used for making signals transmitted by the transmitters of different cells distinguishable (provided that the scrambling codes are properly assigned to the cells).

The geographic area represented schematically in FIG. 1 is assumed to be an area of the UMTS network to be planned.

Figure 2:
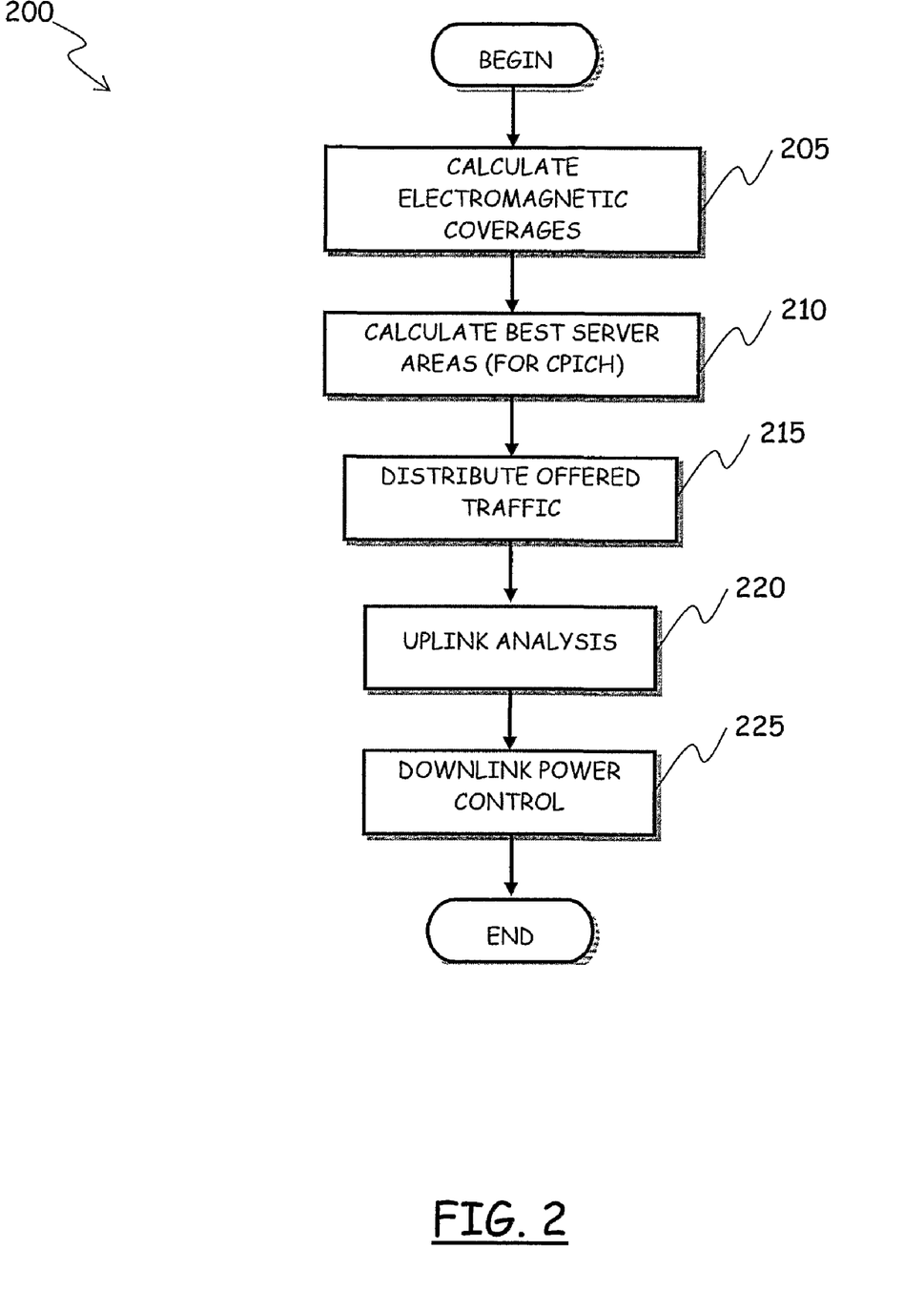
FIG. 2 is a schematic, simplified flowchart of the main steps of a network planning process.

The schematic flowchart of FIG. 2 shows the main phases or steps of a network planning process 200. It is pointed out that the various steps of the planning process, which will be hereinafter analyzed in detail, might be performed in a different chronological order compared to the one shown.

The area under planning is ideally subdivided into elementary areas or pixels, for example square areas of 50 m by 50 m.

Firstly, the electromagnetic coverages of the various network cells are calculated (block 205), for a given, starting network configuration (number and position of BRSs/cells, radio equipment of each BRS, and the like). Calculating the electromagnetic coverages means in particular determining the sizes and the characteristics of each "coverage", i.e., the locus of pixels in which the radio-electric signal is received within a certain radius (for example, 80 Km) from the radiating antenna of the generic cell.

Then, the so-called "best server areas" of the various cells is calculated (block 210). As a result of this step, every pixel belonging to the area under planning is univocally assigned to a respective network cell, i.e. to a respective BRS, which is referred to as the "best server cell" of that pixel. In particular, the best server cell of a generic pixel is the cell whose BRS radiates a signal having a power level (the RSCP), as far as the Common Plot CHannel (CPICH) is considered, being the highest compared to the power levels of the signals radiated by all the other cells that belong to the area under planning.

The distribution of the traffic offered to the network, for the different network services, across the area under planning is then calculated (block 215); as a result, an estimation is obtained of the traffic offered by each network service (e.g., telephony, fax, video-telephony, Internet access, streaming and so on) to each pixel.

An uplink analysis phase follows (block 220), for planning/evaluating an uplink coverage of the network, in which phase the uplink capacity of the BRSs is analyzed based on interference/noise limitations. As a result of the uplink analysis, a plurality of sets of maps is determined, one set of maps for each network service; the generic set of maps includes in turn a number of maps equal to the number of cells of the area under planning: each map is formed by those pixels for which the respective cell (the serving cell) requires the lowest power in the uplink, discarding those pixels for which the transmission power in uplink required to an hypothetic UE located on that pixel exceeds the predetermined UE maximum transmission power, for the generic network service; the pixel map thus calculated, for the generic cell and for the generic network service, is referred to as the "cell uplink service area" for that network service. In the following, a method for performing the uplink analysis according to an embodiment of the present invention will be described in detail.

In the following phase of the planning process, a downlink analysis or downlink planning/evaluation coverage is performed; in particular, in this phase, also referred to as the "downlink power control" (block 225), an evaluation of the downlink coverage by the network portion under planning is performed, so as to find out whether, for the given network configuration based on which the uplink coverage has been evaluated, the downlink is a limiting factor.

For each cell belonging to the area under planning, the cell uplink service area, calculated in the uplink analysis step, is considered. For each pixel belonging to the cell uplink service area, and for every network service, the power per traffic channel required to the considered cell is calculated (thus, the power necessary for supporting the connection with the generic UE located on that pixel and exploiting the considered network service is calculated), assuming that the maximum bit-rate of the service is to be guaranteed. In order for a generic pixel to be considered "served" by the network, the power per traffic channel required to the cell should not exceed the maximum power deliverable by the cell per traffic channel; if, for the generic pixel, the calculated power exceeds the maximum power deliverable per traffic channel by that cell for the considered network service, that pixel is put in outage for insufficient power in downlink. The set of pixels, belonging to the generic cell uplink service area for the generic service and not being in outage for insufficient power in downlink forms the "cell global service area" of the cell for that service. The union of the cell global service areas of the various cells of the area under planning, for the various network services, forms the "network global service area". The set of pixels in outage for insufficient power in downlink, for the generic network service, forms the "downlink outage area" of that service.

The downlink power control phase also encompasses a check of the cell capacity for the total power delivered in downlink. The overall power required to the generic cell (the total power that has to be delivered by the cell for all the traffic channels, for all the network services, plus the power delivered by the cell for the common channels—CPICH, SCH and the like) is then compared to a maximum power deliverable by that cell.

If the overall required power does not exceed the maximum deliverable power, the generic cell passes the capacity check. The cell global service area, for the generic network service, will thus include all those pixels for which:

a) the required power per traffic channel in uplink does not exceed the maximum power deliverable by the generic UE, for the considered network service; and b) the required power per traffic channel in downlink does not exceed the maximum power deliverable by that cell per traffic channel, for the considered network service.

If instead the overall required power exceeds the cell's maximum deliverable power, the capacity check is not passed: the cell is in capacity congestion. The cell global service area will thus include a sub-set of the pixels satisfying the conditions a) and b) above, such sub-set being formed by the pixels that satisfy the further condition:

c) the total power delivered to all the UEs located on the pixels of the cell global service area, for all the network services, is equal to the maximum power deliverable by that cell.

Such a subset of pixels may for example be determined by sorting all the pixels satisfying the conditions a) and b) above by increasing attenuation values, and selecting, among the sorted list of pixels thus obtained, starting from the pixel having the lowest attenuation, the first k pixels in the list for which the condition c) is satisfied.

Also, if cells in capacity congestion are found, it might be necessary to reconsider the assumptions made for the inputs to the planning process, for example the distribution of the offered traffic, and the location of the cells in the area under planning.

Figure 3:
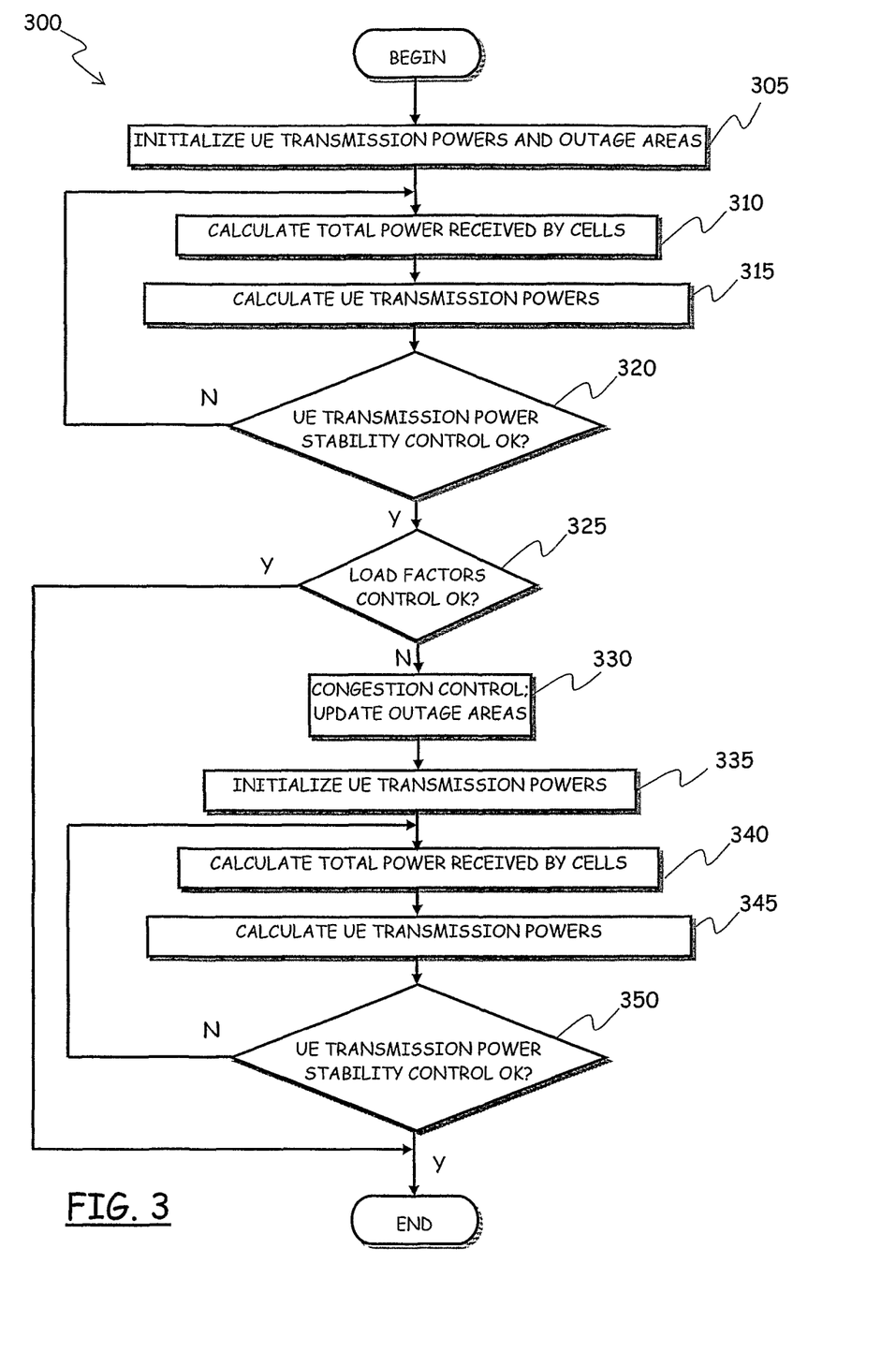
FIG. 3 is a schematic, simplified flowchart of an uplink analysis method of the network planning process, according to an embodiment of the present invention.

A method for performing the uplink analysis according to an embodiment of the present invention will be now described, making reference to the schematic flowchart of FIG. 3.

Firstly, a list of parameters is provided hereinbelow, with corresponding definitions, that will be referred to in the description of the uplink analysis method according to the invention embodiment herein described:

| Symbol | Definition |
|---|---|
| $N_{cells}$ | Number of cells included in the area under planning. |
| S | Set of network services intended to be provided by the network in the area under planning. |
| $S_j$ | Subset of network services, included in the set S, supported by the generic cell $C_j$. |
| (m, n) | Coordinates of the generic pixel in the area under planning. |
| $\Theta_j^s$ | Set of pixels belonging to the initial computation domain for the uplink analysis algorithm, for the generic service s and the generic cell $C_j$. |
| $\Omega_j^s$ | Set of pixels belonging to the cell uplink service area of the cell $C_j$, for the generic network service s. |
| $\Psi_s$ | Set of pixels in outage for the generic network service s. |
| $SNR_s$ | Target signal-to-noise ratio for the generic network services in uplink. |
| $P_{(m,n),s}^j$ | Power required, per dedicated traffic channel (DCH), by the generic cell $C_j$, to the UEs present on the pixel (m, n) and using the generic network service s for guaranteeing the target uplink SNR. |
| $P_{(m,n),s}^{DCH}$ | Transmitted power, per dedicated traffic channel (DCH), by the UEs located on the pixel (m, n), and using the generic network service s. |
| $P_{DCH}^{Max}(s)$ | Maximum power deliverable on the dedicated traffic channel (DCH) for the service s by the generic UE. |
| $P_{DCH}^{Min}(s)$ | Minimum power deliverable on the dedicated traffic channel (DCH) for the service s by the generic UE. |
| $RTWP_j$ | Total power received, over the whole useful frequency band, by the generic cell $C_j$. |
| $\eta_j$ | Load factor in uplink for the generic cell $C_j$. |
| $\eta_{MAX}$ | Maximum admissible load factor in uplink for each cell. |
| $RSCP_{(m,n)}^j$ | Power received (in dBm) on the Common Pilot CHannel (CPICH) of the generic cell $C_j$, by the generic UE located on the pixel (m, n). |

| Symbol | Definition |
| --- | --- |
| $RSCP_{(m,n)}^{BEST}$ | Power received (in dBm) on the Common Pilot CHannel (CPICH) of the best server cell for the pixel (m, n) by the generic UE located on the pixel (m, n). |
| MD | Macrodiversity threshold (in dB). |
| $\Delta_{(m,n)}$ | Set of candidate cells for controlling the power of the generic UE located on the generic pixel (m, n). |
| $P_{Noise}$ | Thermal noise power. |
| $Loss_{(m,n),j}$ | Link attenuation from the generic pixel (m, n) to the generic cell $C_j$. |
| $\bar{\chi}_s$ | Service Activity Factor (SAF) of the generic service s in uplink, a statistical parameter indicating the ratio of the average transmission time in uplink to the total connection time in respect of the service s. |
| $T_{(m,n),s}$ | Number of UEs present on the generic pixel (m, n) in respect of the generic network service s. |

Firstly (block 305), the UE transmission powers and the service outage areas are initialized. In particular, for each pixel (m,n) belonging to the area under planning, and for each UE present on the generic pixel (m,n), the respective required transmission power $p_{(m,n),s}^{DCH}$ is initialized, for each network service s, to 0:

$$p_{(m,n),s}^{DCH} = 0 \, \forall s \in S \text{ and } \forall (m,n) \in \Phi_s$$

As a consequence of this initialization to 0 of the required transmission power $p_{(m,n),s}^{DCH}$, the sets $\Psi_s$, $\forall s \in S$, of the pixels in service outage are initialized to the void set, for each network service s belonging to the set S of network services intended to be provided. It is pointed out that, in alternative embodiments of the invention, the required transmission power $p_{(m,n),s}^{DCH}$ might as well be initialized to a value different than 0, for example to a value dependent on, for example proportional to the initial service area, which, in the example herein considered, is the best server (CPICH) area, or to a value dependent on, for example proportional to the traffic offered to said pixel (m,n).

A loop is then entered directed to controlling the uplink power requested to the UEs.

In particular, at each iteration of the loop, the total power $RTWP_j$ received in uplink by the generic cell $C_j$, over the whole useful frequency band, is calculated (block 310), as follows:

$$RTWP_j = \sum_{s \in S_j} \sum_{(m,n) \in \Phi_s - \Psi_s} \frac{p_{(m,n),s}^{DCH} \cdot T_{(m,n),s} \cdot \bar{X}_s}{Loss_{(m,n),j}} + P_{Noise}.$$

Based on the calculated total received power $RTWP_j$, new values of the required transmission powers required to the UEs are calculated (block 315), for every pixel (m,n) of the area under planning, and for every network service s. This calculation also involves a calculation of the cell service areas, for each network service. The goal of these calculations is to determine, for each pixel (m,n) of the area under planning and each network service s, the cell that requires the minimum transmission power to a hypothetic UE located on that pixel and exploiting that service, and to determine the amount of such minimum transmission power. The cells that can control the power of an UE located on the pixel (m,n) are all those cells Cj (j=1 ... $N_{cells}$) for which the corresponding $RSCP_{(m,n)}^j$ value is at most MD dB below the $RSCP_{(m,n)}^{BEST}$ value, i.e. all those cells for which the respective CPICH is received, at the considered pixel (m,n), with a power that, compared to the power at which the CPICH of the best server cell is received, is in the range $[RSCP(m,n)^{BEST} - MD; RSCP_{(m,n)}^{BEST}]$.

The set $\Delta_{(m,n)}$ is thus built in the following way:

$$\Delta_{(m,n)} = \forall C_j : RSCP_{(m,n)}^j \geq RSCP_{(m,n)}^{BEST} - MD.$$

For each pixel (m,n) of the area under planning, for each cell $C_j$ belonging to the set $\Delta_{(m,n)}$, and for each network service $s \in S_j$, the transmission powers required to the hypothetic UEs located on that pixel by the cell $C_j$ for guaranteeing the target SNR are calculated as follows:

$$SNR_s = \frac{p_{(m,n),s}^j}{Loss_{(m,n),j}} \cdot \frac{1}{\left( RTWP_j - \frac{p_{(m,n),s}^j}{Loss_{(m,n),j}} \right)} \Rightarrow p_{(m,n),s}^j$$

$$= RTWP_j \cdot \frac{SNR_s}{1 + SNR_s} \cdot Loss_{(m,n),j}$$

The calculated UE transmission power has to fall within predetermined maximum/minimum ratings established for the generic UE, and which to be considered as inputs to the planning process, whereby:

$$p_{(m,n),s}^j = \begin{cases} RTWP_j \cdot \frac{SNR_s}{1+SNR_s} \cdot Loss_{(m,n),j} & \text{if } RTWP_j \cdot \frac{SNR_s}{1+SNR_s} \cdot Loss_{(m,n),j} \geq p_{DCH}^{Min}(s) \\ p_{DCH}^{Min}(s) & \text{if } RTWP_j \cdot \frac{SNR_s}{1+SNR_s} \cdot Loss_{(m,n),j} < p_{DCH}^{Min}(s) \end{cases}$$

Then, the cell is determined which, among all the cells belonging to the set $\Delta_{(m,n)}$, requires to the UEs the minimum transmission power: such a cell is, at the generic current iteration of the loop, the serving cell of the pixel (m,n), as far as that generic network service is considered.

In this way, the set $\Omega_j^s$ is calculated, for each cell Cj belonging to the set $\Delta_{(m,n)}$ and for each network service $s \in S_j$, in the following way:

$$\Omega_j^s = \forall (m,n) \in \Phi_s : \begin{cases} p_{(m,n),s}^j = \text{MIN}[p_{(m,n),s}^j]_{j \in \Delta_{(m,n)}}^{s \in S_j} \\ e \\ p_{(m,n),s}^j \leq p_{DCH}^{Max}(s) \end{cases}$$

The transmission power required to the generic UE located on the pixel (m,n) by the serving cell of that pixel for the network service s (at the generic current iteration of the loop) is thus calculated as follows:

$$p_{(m,n),s}^{DCH} = \text{MIN}[p_{(m,n),s}^j]_{j \in \Delta_{(m,n)}}^{s \in S_j}$$

The area $\Psi_s$ of service outage, for the generic service s, at the generic current iteration of the loop, is defined as the set of pixels (m,n) belonging to the set $\Phi_s$ which do not belong to any one of the calculated sets $\Omega_j^s$ for any cell $C_j$ belonging to the area under planning, that is:

$$\Psi_s = \forall (m,n) \in \Phi_s, (m,n) \notin \Omega_j^s \, \forall j.$$

The loop is exited when convergence is reached, identified by the reaching of a stability condition, as far as the calculated UE transmission powers are concerned (decision block 320). In particular, the condition of stability is determined setting a power tolerance Tol_UE_Pw (sufficiently small, for example from 0.5 dB to 1 dB): a stability condition is decreed to have been reached if, in passing from the generic, (k−1) iteration to the next, k iteration of the loop, it results that:

$$|p_{(m,n),s}^{DCH}(k)_{dB} - p_{(m,n),s}^{DCH}(k-1)_{dB}| \leq Tol\_UE\_Pw$$

for each pixel (m,n) of the area under planning, and for each service s, i.e. if the changes in the calculated required powers are less than the set tolerance.

After exiting the loop, a control is performed to ascertain whether all the load factors in uplink are, at most, equal to a predetermined maximum load factor (block 325). Defined the load factor in uplink for the generic cell $C_j$ as:

$$\eta_j = 1 - \frac{P_{Noise}}{RTWP_j},$$

the test is passed if, for every cell $C_j$ of the area under planning, it is:

$$\eta_j \leq \eta_{MAX}.$$

If the test is passed, the procedure ends. If instead the test on the load factors is not passed, a congestion control is performed (block 330). A set θ is built, formed by all the cells of the area under planning for which the test is not passed, i.e. for which it is:

$$\eta_j > \eta_{MAX} \text{ and } \Omega_j^s \neq Void,$$

i.e. all the cells experiencing a calculated load factor that exceeds the predetermined maximum load factor, and which have a non-void service area.

For each cell Cj belonging to the set θ, a respective uplink congestion indicator Cong-$UL_j$ is calculated as follows:

$$Cong\_UL_j = \xi(\eta_j, \eta_{MAX}),$$

wherein $\xi(\eta_j, \eta_{MAX})$ denotes a function of the load factors adapted to return a value in the range from 0 (excluded) to 100. In particular, and only by way of example (other forms for the function $\xi(\eta_j, \eta_{MAX})$ are possible), the function $\xi(\eta_j, \eta_{MAX})$ may take the following form:

$$\xi(\eta_j, \eta_{MAX}) = 100 \cdot \frac{\eta_j - \eta_{MAX}}{\eta_j}.$$

In other words, the uplink congestion indicator Cong-$UL_j$ is a number giving a measure of the congestion, in uplink, experienced by the generic cell $C_j$ and depending on the difference of the calculated load factor $\eta_j$ for that cell and the maximum load factor $\eta_{MAX}$.

For each cell $C_j$ belonging to the set θ, and for each network service s belonging to the set S of services intended to be provided, a decongestion function β is used; the decongestion function β is an operator applied to the uplink congestion indicator Cong-$UL_j$ of the generic cell for returning a value Cong_$Tick_s$, preferably ranging from 0 to 1, which expresses, in terms of a percentage, the number of pixels, among those being part of the service area $\Omega_j^s$ of the cell Cj in respect of the network service s, that are to be placed in service outage due to reasons of congestion in uplink. The decongestion function β, $$Cong\_Tick_s = \beta_j^s(Cong\_UL_j)$$

may for example take a staircase-like shape, increasing from 0 to 1 as the value of the uplink congestion indicator Cong-$UL_j$ increases; just by way of example, the decongestion function β may be described as follows:

Cong-$UL_j \leq 10$  β=0.01 (1% of pixels)

$10 \leq$ Cong-$UL_j \leq 20$  β=0.02 (2% of pixels)

$20 <$ Cong-$UL_j \leq 50$  β=0.1 (10% of pixels)

Cong-$UL_j > 50$  β=0.4 (40% of pixels)

For each cell $C_j$ belonging to the set θ, a sorting function is built for each pixel (m,n):

$$\Re_{(m,n)}^j(Loss_{(m,n),j}, S_j, T_{(m,n),s}),$$

the sorting function being, in the example herein considered, a function of the link loss $Loss_{(m,n),j}$, the sub-set $S_j$ of network services, included in the set S, supported by the generic cell $C_j$, and the number of UEs $T_{(m,n),s}$. The pixels (m,n) belonging to the set (service area) $\Omega_j^s$ of the cell $C_j$ in respect of the network service s are sorted, by applying the ordering function, in such a way that, taken two generic pixels (m1,n1) and (m2,n2), the pixel (m1,n1) precedes the pixel (m2,n2) if and only if:

$$\Re_{(m1,n1)}^j < \Re_{(m2,n2)}^j.$$

For example, the ordering function may be simply represented by the loss $Loss_{(m,n),j}$, in which case a generic pixel precedes another pixel provided that its loss is lower than the loss of said other pixel. More generally, the pixels may be sorted based on one or more parameter indicative of the respective contribution to the cell's uplink load factor, said parameter including for example the link loss, the traffic offered by the pixel, the type of traffic (e.g., emergency calls may be privileged over normal calls).

For each cell $C_j$ belonging to the set θ, and for any network service s belonging to the sub-set $S_j$, the dimension, in terms of number of pixels, of the cell service area for the cell $C_j$ is denoted Card[$\Omega_j^s$]. The service outage area $\Psi_s$, previously calculated, is updated by including a number of pixels equal to:

$$\lfloor Cong\_Tick_s \cdot Card[\Omega_j^s] \rfloor$$

taken from the set of pixels $\Omega_j^s$ forming the service area of the cell Cj in respect of the network service s, starting from the first pixel according to the sorting produced by applying to the set $\Omega_j^s$ the ordering function $\Re_{(m,n)}^j$ defined above. Thus, the cell service area is restricted. More generally, the dimension, in terms of number of pixels, of the cell service area for the cell $C_j$ may be restricted in a way dependent on, particularly proportional to a difference between the calculated cell uplink load factor and the maximum load factor.

Then (block 335), for each pixel (m,n) belonging to the area under planning, and for each hypothetic UE located on that pixel, the transmission power required to the UE for the each network service is initialized:

$$p_{(m,n),s}^{DCH} = 0 \ \forall s \in S \text{ and } \forall (m,n) \in \Phi_s$$

Afterwards, a further loop is entered essentially similar to the previous loop, in which, at each iteration of the loop, the total power $RTWP_j$ received in uplink by the generic cell $C_j$, over the whole useful frequency band, is calculated (block 340), in the way described above, and then the new values of the required transmission powers required to the UEs are calculated (block 345), for every pixel (m,n) of the area under planning, and for every network service s.

The loop is exited when a stability condition is reached, as far as the calculated UE transmission powers are concerned (decision block 350). In particular, the condition of stability is determined setting a power tolerance, which can be the same tolerance Toll_UE_Pw used before: a stability condition is decreed to have been reached if, in passing from the generic (k−1) to the next k iteration of the loop, it results that:

$$|p_{(m,n),s}^{DCH}(k)_{dB} - p_{(m,n),s}^{DCH}(k-1)_{dB}| \leq Toll\_UE\_Pw$$

for each pixel (m,n) of the area under planning, and for each service s.

Thus, according to the described embodiment of the present invention, the congestion control step 330 allows controlling the cell load in uplink, and to discard from consideration, from the uplink power control phase, a sub-set of pixels for each one of the cells that result to be overloaded (i.e., those cells for which the calculated load factor exceeds the maximum allowable load factor). In this way, it is avoided the need of performing the admission control phase preliminary to the uplink power control phase. The results of the uplink analysis performed according to the described embodiment of the invention are not affected by more or less realistic assumptions, as it was instead the case should the admission control phase be performed, particularly in respect of the interference in the uplink: the cell load is in fact controlled directly within the uplink power control phase.

This approach allows overcoming the limitations of the prior-art planning methodologies, and the dimensioning of the service areas is more precise, whereby the estimation of the served traffic and of the network performance are better.

Figure 4:
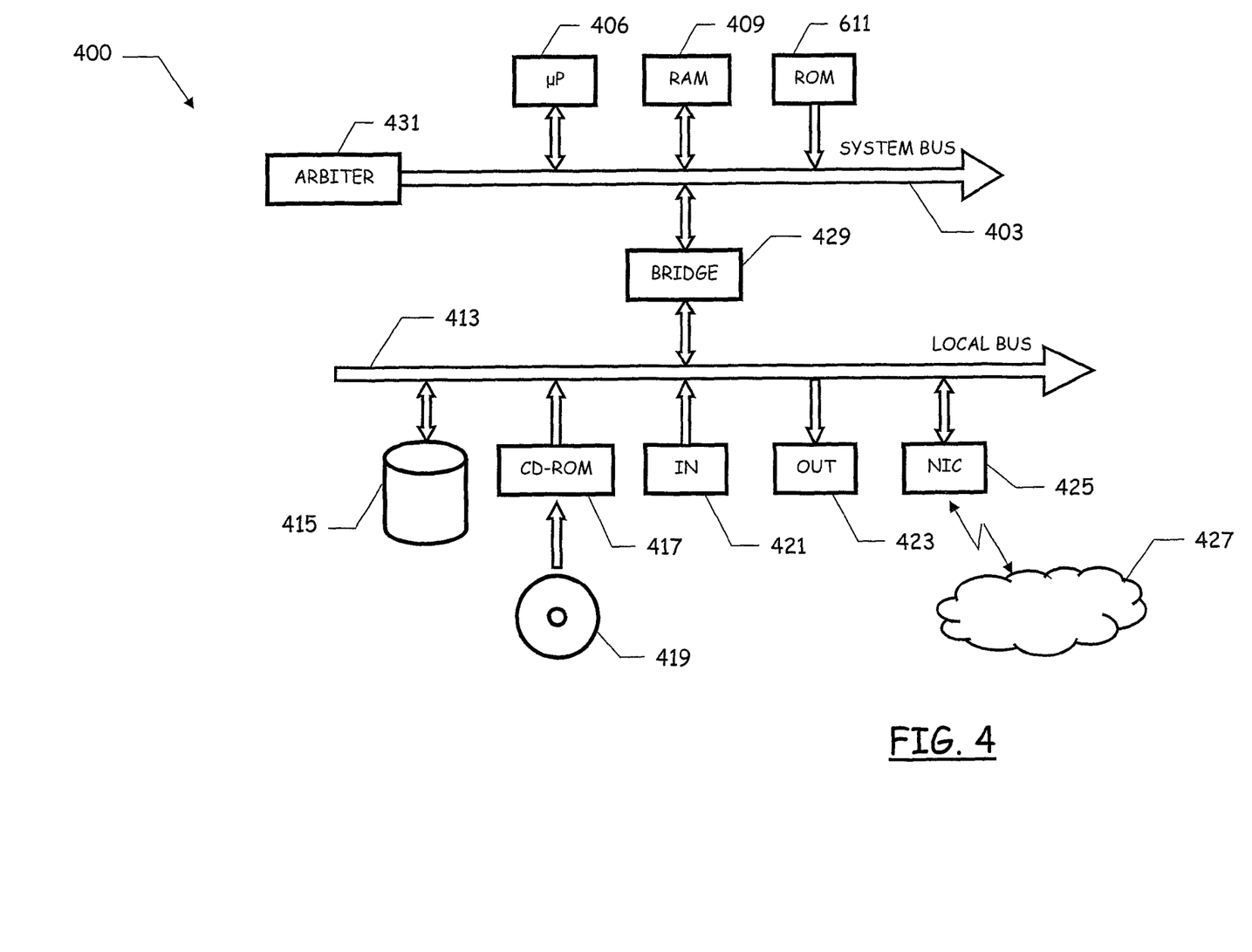
FIG. 4 schematically shows the main functional components of a data processing apparatus that, suitably programmed, is adapted to carry out the method according to an embodiment of the invention.

The above described method may be implemented in hardware, software, or partly in hardware and partly in software. In particular it can be carried out by a suitably programmed data processing apparatus or system like a personal computer or a workstation; the structure of a general-purpose computer 400 is schematically depicted in FIG. 4.

The computer 400 is comprised of several units that are connected in parallel to a system bus 403. In detail, one (possibly more) processor (μp) 406 controls the operation of the computer 400; a RAM 409 is directly used as a working memory by the microprocessor 406, and a ROM 411 stores the basic code for a bootstrap of the computer 400. Peripheral units are connected (by means of respective interfaces) to a local bus 413. Particularly, mass storage devices comprise a hard disk 415 and a CD-ROM/DVD-ROM drive 417 for reading CD-ROMs/DVD-ROMs 419. Moreover, the computer 400 typically includes input devices 421, for example a keyboard and a mouse, and output devices 423, such as a display device (monitor) and a printer. A Network Interface Card (NIC) 425 is used to connect the computer 400 to a network 427, e.g. a LAN. A bridge unit 429 interfaces the system bus 403 with the local bus 413. Each microprocessor 406 and the bridge unit 429 can operate as master agents requesting an access to the system bus 403 for transmitting information; an arbiter 431 manages the granting of the access to the system bus 403.

Figure 5:
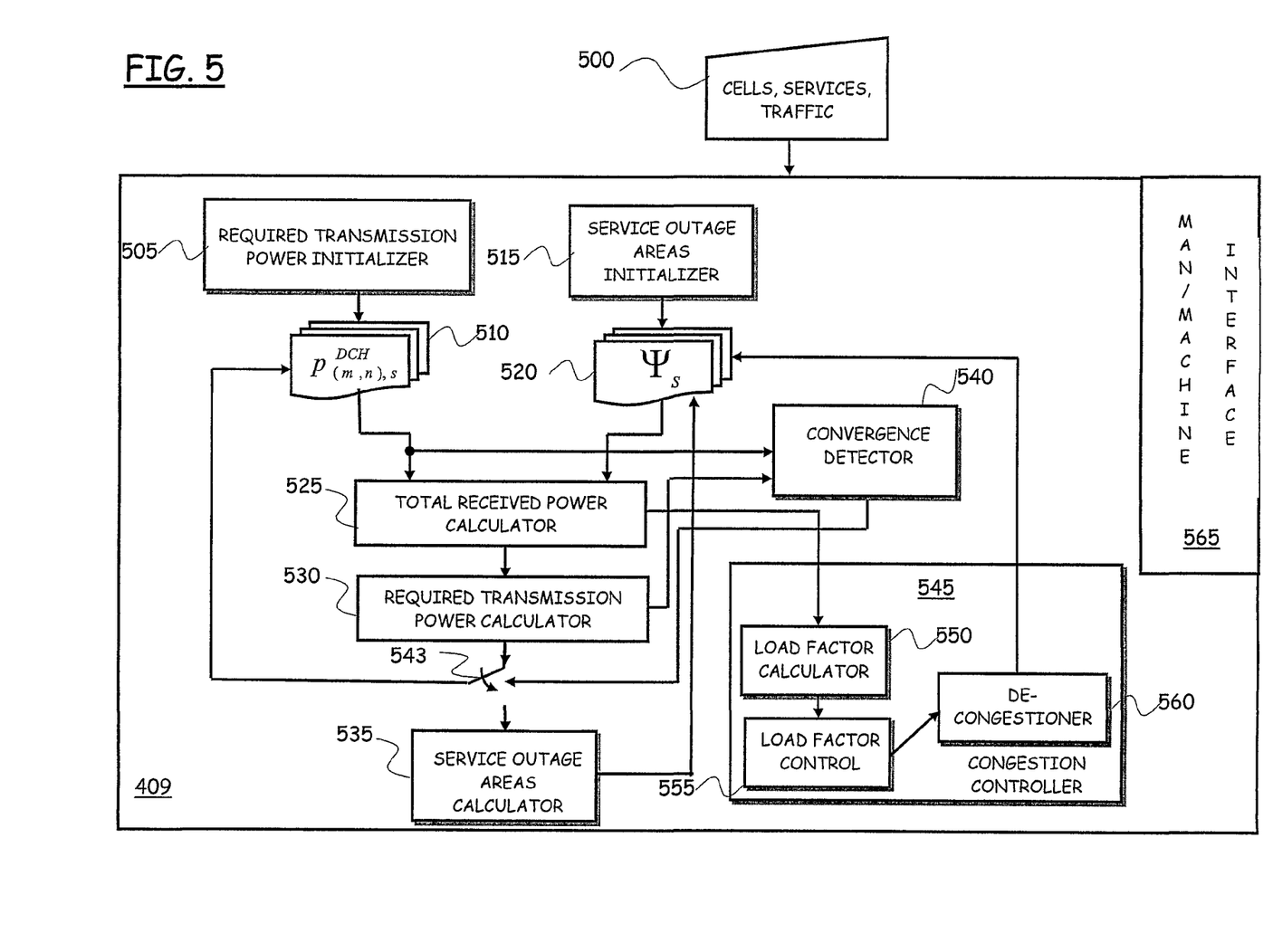
FIG. 5 schematically shows the main components of a program, when executed on the data processing apparatus of FIG. 4, implementing the method according to an embodiment of the present invention.

FIG. 5 is a pictorial representation of the main computer program components adapted to implement the above-described uplink analysis method, according to an embodiment of the invention. In particular, FIG. 5 schematically depicts a partial content of the working memory 409 of the computer of FIG. 4. The information (programs and data) is typically stored on the hard disks and loaded (at least partially) into the working memory when the program is executed. The programs may be initially installed onto the hard disks from, e.g., CD-ROMs or DVD-ROMs, or they may be downloaded from, e.g., a distribution server machine through the data communications network 427.

The inputs 500 to the program includes for example the number of cells and the location thereof, the network service intended to be provided, the traffic and its distribution across the pixels of the area of planning, the transmission power ratings of the UEs and of the cells, and the like.

A required transmission power initializer module 505 initializes (e.g., to 0) the values of variables 510 that represent the UEs' required transmission powers $p_{(m,n),s}^{DCH}$ per traffic channel and service. Similarly, a service outage areas initializer module 515 initializes (e.g., to the void set) variables 520 representing the service outage areas $\Psi_s$ of the various network services.

A total received power calculator module 525 calculates the total power RTWP received by the network cells, applying the formula presented in the foregoing, and a required transmission power calculator module 530 calculates the values of the UEs' required transmission powers $p_{(m,n),s}^{DCH}$ updating the values of the variables 510. Based on the results of the required transmission power calculator module 530, a service outage area calculator module 535 re-calculates the service outage areas $\Psi_s$ and updates the values of the variables 520.

A convergence detector module 540 detects when convergence has been reached, by checking whether the transmission powers calculated in a current iteration differ from those calculated in the previous iteration by less that the predetermined tolerance. The congestion detector module 540 is adapted to cause the stopping of the iteration when a stability condition is reached (as schematized by the switch 543).

A congestion controller module 545 performs a control of congestion situations. A load factor calculator 550 calculates the load factors for the various cells, and a load factor control module 555 ascertains whether there are over-loaded, congestioned cells, for which the load factor exceeds the predetermined maximum load factor. For the congestioned cells, a cell de-congestioner module 560 removes from the service outage areas selected pixels, according to the procedure described in detail in the foregoing.

A man/machine interface module 565, e.g. a graphical user interface, allows displaying the results of the downlink power control algorithm.

Although the present invention has been disclosed and described by way of some embodiments, it is apparent to those skilled in the art that several modifications to the described embodiments, as well as other embodiments of the present invention are possible without departing from the spirit or essential features thereof/the scope thereof as defined in the appended claims.

The invention claimed is:

1. A method for planning a cellular mobile telecommunications network comprising at least one network cell and intended to provide at least one network service to a plurality of user equipment located in said network cell, comprising:
   a) initializing, for the at least one network cell, a service area and a transmission power for each user equipment, the service area comprising a plurality of pixels, each pixel being assigned a network cell as its serving cell;
   b) estimating a total power received by each network cell from the plurality of user equipment located in the plurality of pixels using the corresponding network cell as the serving cell and using the at least one network service;
   c) based on the estimated total received power, determining the transmission powers required by the at least one network cell from the user equipment located in each pixel of the service area in order to update the serving cell of the corresponding pixel with a network cell, among the at least one network cell, that requires minimum transmission power;

d) iterating said steps b) and c) until a stability condition is reached wherein a variation in the transmission power required by at least one pixel is lower than a predetermined threshold;

e) calculating a total received power corresponding to the transmission powers at the end of step d);

(f) ascertaining whether the total received power is lower than a maximum received power, and, in the negative case:

g) restricting said service area; and h) repeating said steps from b) to g) for said restricted service area.

2. The method of claim 1, wherein said service area is restricted based on a difference between the calculated uplink load factor and the maximum uplink load factor.

3. The method of claim 2, wherein said service area is restricted proportionally to said difference.

4. The method of claim 1, wherein said service area comprises a plurality of elementary area elements, and said restricting comprises:

establishing an ordered list of said elementary area elements based on the value of a parameter indicative of a respective contribution of said elementary area elements to the total received power; and discarding at least one of said elementary area elements at one end of said list.

5. The method of claim 4, wherein said parameter comprises the uplink link loss.

6. The method of claim 4, wherein said parameter comprises the total traffic offered by a pixel.

7. The method of claim 4, wherein said parameter comprises the type of traffic offered by a pixel.

8. The method of claim 1, wherein said initializing the service area comprises taking as an initial service area a best server area of the cell calculated for a predetermined communications channel.

9. The method of claim 8, wherein said predetermined communications channel is a common pilot channel.

10. The method of claim 1, wherein in said initializing, for the at least one network cell, the transmission power for each user equipment comprises initializing the transmission power to a value dependent on, particularly proportional to, a value to which the service area is initialized.

11. The method of claim 10, wherein in said initializing, for the at least one network cell, the transmission power for each user equipment comprises initializing the transmission power to a value dependent on, particularly proportional to, an amount of traffic offered to the cell based on a value to which the service area is initialized.

12. The method of claim 1, wherein the quality of service constraint is a target service signal-to-noise ratio.

13. The method of claim 1, wherein ascertaining whether the total received power is lower than a maximum received power comprises calculating an uplink load factor corresponding to the total received power calculated in step e); and ascertaining whether the calculated uplink load factor is lower than a maximum uplink load factor.

14. A data processing system comprising a processor configured to carry out the steps of the method according to claim 1.

15. A non-transitory computer readable medium encoded with a computer program comprising instructions for carrying out all the steps of the method according to claim 1, when said computer program is executed on a computer system.

16. A cellular mobile telecommunications network comprising at least one network cell and intended to provide network services to users located in said network cell, wherein the network is planned according to the method of claim 1.

* * * * *